United States Patent [19]

Fague

[11] Patent Number: 5,814,138
[45] Date of Patent: Sep. 29, 1998

[54] MICROWAVE DRYABLE THERMAL INK JET INKS

[75] Inventor: Gary R. Fague, Canandaigua, N.Y.

[73] Assignee: Xerox Corporation, Stamford, Conn.

[21] Appl. No.: 788,146

[22] Filed: Jan. 24, 1997

[51] Int. Cl.$^6$ .................................................. C09D 11/02
[52] U.S. Cl. .................... 106/31.43; 106/31.49; 106/31.57; 106/31.58; 106/31.75; 106/31.78; 106/31.86; 106/31.87
[58] Field of Search .............................. 106/31.43, 31.49, 106/31.57, 31.58, 31.75, 31.78, 31.86, 31.87

[56] References Cited

U.S. PATENT DOCUMENTS

| | | | |
|---|---|---|---|
| 4,585,484 | 4/1986 | Haruta et al. | 106/31.58 |
| 4,627,875 | 12/1986 | Kobayashi et al. | 106/31.58 |
| 4,713,113 | 12/1987 | Shimada et al. | 106/31.43 |
| 5,220,346 | 6/1993 | Carreira et al. | 106/31.43 |
| 5,371,531 | 12/1994 | Rezanka et al. | 347/43 |
| 5,563,644 | 10/1996 | Isganitis et al. | 106/31.43 |
| 5,709,737 | 1/1998 | Malhotra et al. | 106/31.43 |

*Primary Examiner*—Helene Klemanski
*Attorney, Agent, or Firm*—Oliff & Berridge, PLC

[57] ABSTRACT

A microwave dryable thermal ink jet ink including an aqueous liquid vehicle, a co-solvent of formylethanolamine, acetylethanolamine, triethanolamine, trimethylolpropane, thiodiethanol, sulfolane and 1,3-dimethylimidazolidinone, a colorant, and ammonium bromide is described. Ammonium chloride may also be included in the microwave dryable ink so long as the ink also contains ethylene glycol as a second co-solvent. A method of forming an image on an image receiving substrate with a microwave dryable thermal ink jet ink of applying in imagewise fashion to the image receiving substrate by thermal ink jetting a microwave dryable thermal ink jet ink comprising formylethanolamine, acetylethanolamine, triethanolamine, trimethylolpropane, thiodiethanol and 1,3-dimethylimidazolidinone, a colorant, and ammonium bromide, and thereafter exposing the image receiving substrate to microwave radiation to dry the image on the substrate is also described. The inks of the invention exhibit good latency and cause no paper curl following microwave drying.

20 Claims, No Drawings

MICROWAVE DRYABLE THERMAL INK JET INKS

BACKGROUND OF THE INVENTION

1. Field of Invention

The present invention relates to printing inks for use for thermal ink jet printers in which drying of the ink upon a substrate is accomplished with microwave radiation. The invention also relates to a thermal ink jet printing process using the microwave dryable ink wherein the ink exhibits good latency across a wide variety of printhead nozzle dimensions, as well as exhibits substantially no paper curl following microwave drying.

2. Description of Related Art

Ink jet printing is a non-impact method that produces droplets of ink that are deposited on a substrate such as paper or transparent film in response to an electronic digital signal. Thermal or bubble jet drop-on-demand ink jet printers have found broad application as output devices for personal computers in the office and the home.

In existing thermal ink jet printing, the printhead typically comprises one or more ink jet ejectors. For example, each ejector may include a channel communicating with an ink supply chamber, or manifold, at one end and having an opening at the opposite end, referred to as a nozzle. A thermal energy generator, usually a resistor, is located in each of the channels, a predetermined distance from the nozzles. The resistors are individually addressed with a current pulse to momentarily vaporize the ink and form a bubble which expels an ink droplet. As the bubble grows, the ink rapidly bulges from the nozzle and is momentarily contained by the surface tension of the ink as a meniscus. As the bubble begins to collapse, the ink still in the channel between the nozzle and bubble starts to move towards the collapsing bubble, causing a volumetric contraction of the ink at the nozzle and resulting in the separation from the nozzle of the bulging ink as a droplet. The acceleration of the ink out of the nozzle while the bubble is growing provides the momentum and velocity to direct the droplet towards a print sheet, such as a piece of paper. Because the droplet of ink is emitted only when the resistor is actuated, this type of thermal ink jet printing is known as "drop-on-demand" printing. Other types of ink jet printing, such as continuous-stream or acoustic, are also known.

The printhead typically comprises a linear array of ejectors, and the printhead is moved relative to the surface of the print sheet, either by moving the print sheet relative to a stationary printhead, or vice versa, or both. In some types of apparatus, a relatively small printhead moves across a print sheet numerous times and swathes, much like a typewriter. Alternatively, a printhead may consist of an array of ejectors and extend the full width of the print sheet. In this apparatus, the printhead is passed once down the print sheet to give full-page images, in what is known as a "full-width array" (FWA) printer. When the printhead and the print sheet are moving relative to each other, imagewise digital data is used to selectively activate the thermal energy generators in the printhead at the appropriate time so that the desired image will be created on the print sheet.

Typical inks used in thermal ink jet printing contain water as the major ink vehicle. Water has the advantage of being non-toxic, non-combustible, and environmentally sound relative to non-aqueous inks which are largely composed of organic solvents. Water is also an excellent medium for dispersed pigments or dissolved dyes.

The use of water in large concentrations, however, also has several disadvantages. Water has a slow evaporation rate relative to low-boiling organic solvents, which reduces the rate of drying and, thus, the rate of printing. Water also interacts with paper to cause two major distortions known as paper cockle and paper curl. Paper cockle is a distortion in which bumps, indentations and other irregularities are randomly produced on the printed paper, giving the paper a wrinkled appearance. Curl is a phenomena in which the edges of the paper migrate towards the center of the paper. The direction of the curl may be on the printed side of the paper or it may be on the non-printed side of the paper.

Curl may appear immediately after printing, immediately after drying, or may take a few days to manifest. In its final state, the paper sheet may take the form of a tube. Curled paper cannot be stacked, sheet upon sheet, thereby causing much inconvenience to the user. Curled sheets are difficult to display or store and cannot be used in processes requiring near planarity, such media feeding, tracking, and print alignment. Curl is most prevalent in solid fill printing and is therefore a more acute problem in graphics than in text printing. For the same reason, it is also a concern for color printing or where graphics are prominent. The use of heating elements, particularly microwave radiation, used to increase the rate of drying of the aqueous inks is known to accelerate paper curl.

With the advances in ink jet printing and the ability for ink jet printers to print at greater speeds, problems arose with the requirements of increasing the rate of drying of aqueous inks. Various drying devices are commonly employed for this purpose, including microwave dryers as set forth in U.S. Pat. Nos. 5,220,346 and 4,327,174, the disclosures of which are incorporated herein by reference. The inks employed in ink jet printers having microwave dryers typically contain metal salts, which improve the rate of drying. However, such additives also increase the occurrence of paper curl.

Preferred microwave dryable inks contain water, ethylene glycol as a co-solvent, a colorant and a microwave coupling agent such as a metal salt. Ethylene glycol is the preferred co-solvent due to it being an excellent solvent for the microwave coupling agent and most dye colorants. However, ethylene glycol contributes significantly to paper curl. Furthermore, some foreign countries do not permit the use of ethylene glycol due to a presumption of human toxicity. It would therefore be desirable to replace some or all of the ethylene glycol with other suitable co-solvents not having these drawbacks.

An additional requirement placed on microwave dryable inks is the ability to be jetted through a variety of ink jet sizes. Current printers range from 300 dots per inch (dpi) to 600 dpi. Six-hundred dpi printers provide enhanced resolution and possess significantly narrower ink jet nozzles compared to 300 dpi printers. The smaller dimensions of the nozzle typically cause the ink to exhibit a shorter latency. In other words, an ink having a suitable latency for a 300 dpi printer may have an unsuitable latency for a 600 dpi printer. Thermal ink jet inks with high solid contents or high viscosities caused by the use of elevated levels of co-solvent suffer the greatest latency loss from the decreased device dimensions.

In addition, the smaller drop size associated with smaller nozzle dimensions results in about 40% less color being ejected onto the paper. Thus, to maintain print density, the dye concentration of the ink is typically increased by about 40%. This increase negatively impacts latency because the increased dye amount becomes less soluble in the co-solvent.

Microwave drying of the ink imposes the further requirement that the ink be electrically conductive, which is accomplished by the addition of a suitable salt. Addition of the salt also seriously impacts latency due to the natural tendency of such salts to be incompatible with the co-solvent and/or color dye. Thus, it is desirous to develop an ink capable of use in printers ranging from 300 dpi to 600 dpi, wherein the ink possesses acceptable performance, including latency, with all such printers.

Developing suitable microwave dryable inks addressing the above concerns, particularly developing microwave dryable inks replacing ethylene glycol as the co-solvent, is difficult. The components of microwave dryable inks must be precisely chosen in that the inks need to satisfy specific properties such as viscosity, good solids solubility in the co-solvent, vapor pressure, surface tension, low toxicity, etc., while also exhibiting satisfactory latency, stability, drying time, etc. Often, alternative and/or additional components may satisfactorily improve one or more properties while simultaneously unsatisfactorily degrading other properties.

What is desired is a microwave dryable ink exhibiting good latency and reduced paper curl while also exhibiting satisfactory levels of the ink and performance properties discussed above.

SUMMARY OF THE INVENTION

It is an object of the present invention to develop a microwave dryable ink containing low toxicity components and exhibiting good latency. The latency is preferably satisfactory across a range of printers, for example, printers of 300 dpi resolution as well as printers of 600 dpi resolution.

It is a further object of the present invention to develop a microwave dryable ink exhibiting substantially no paper curl following printing and microwave drying of the ink.

It is a still further object of the present invention to develop a method of forming an image with a microwave dryable ink in which the ink possesses good latency, exhibits fast drying with microwave radiation, and causes substantially no paper curl.

These and other objects of the present invention are achieved by a microwave dryable thermal ink jet ink containing an aqueous liquid vehicle, a co-solvent selected from the group consisting of formylethanolamine, acetylethalomine, triethanolamine, trimethylolpropane, thiodiethanol, sulfolane and 1,3-dimethylimidizolidinone, a colorant and ammonium bromide as the microwave coupling agent. In addition, the invention is achieved with a microwave dryable ink jet ink containing the above components and ammonium chloride in place of or in conjunction with ammonium bromide, so long as the ink composition also contains ethylene glycol as a second co-solvent in amounts effecting substantially no paper curl.

The invention is also achieved by a method of forming an image on an image receiving substrate with the above inks, wherein the inks are applied in imagewise fashion to the substrate and thereafter exposed to microwave radiation to dry the image on the substrate. The substrate with the image does not exhibit paper curl.

DETAILED DESCRIPTION OF PREFERRED EMBODIMENTS

In a first embodiment of the invention, the microwave dryable thermal ink jet inks comprise a liquid vehicle comprising a mixture of water and one or more miscible organic co-solvents. The water is preferably deionized water. For thermal ink jet ink applications, the water preferably comprises more than 50% by weight of the ink, more preferably between 55% and 75% by weight of the ink.

In order to enable the microwave dryable ink to be dried upon exposure to microwave radiation, the ink must contain a microwave coupling agent, i.e., a material in which the ions couple with the microwave electric field. By so coupling with the microwave electric field, the ions of the agent vibrate within the ink, thereby creating heat to effect a more rapid drying of the ink. Thus, inclusion of the microwave coupling agent allows for drying of an image printed with the ink to be accomplished through microwave energy, thereby allowing quicker drying of each image formed upon a substrate and thus significantly increasing the speed and output of the printing device.

As the microwave coupling agent, ammonium chloride and ammonium bromide are most preferred because of their low molecular weight and good solubility in the liquid vehicle of the ink. Further, ammonium chloride and ammonium bromide exhibit a high degree of disassociation in the liquid vehicle, thereby resulting in a large number of free ions in the ink. This in turn results in higher conductivity with these materials at lesser loading amounts compared to other ionic compounds. Lower amounts of the microwave coupling agent are preferred in order to increase the overall solubility of the ink solids in the liquid vehicle and decrease the ink solids content, thereby permitting an increase in the latency of the ink.

The microwave dryable inks may also contain additional ionic compounds, or salts, in conjunction with ammonium chloride and/or ammonium bromide. For example, the microwave coupling agent may further comprise suitable salts such as NaCl, $CaCl_2$, NaI, $NaNO_3$ $(NH_4)_2SO_4$, LiCl, and the like.

The amount of the microwave coupling agent present in the ink preferably ranges from 0.25% to 5% weight of the ink, more preferably from 1% to 3% by weight of the ink. The amount of the microwave coupling agent also depends upon the size and valency of the ions in the compound, the desired printing process speed, the desired ink conductivity, the size of the image with respect to dimensions and ink deposition density on paper, the power level of the microwave drying apparatus, and the like.

Generally, microwave dryable inks should have a conductivity of, for example, at least 10 milliSiemens per centimeter, and more preferably about 10 to about 30 milliSiemens per centimeter. Higher levels of conductivity generally enable microwave drying of the image with reduced power levels. However, excessive conductivities can adversely affect ink characteristics in that other ink components such as dye colorants may be rendered insoluble in the liquid vehicle at high salt concentrations.

Suitable co-solvents of the microwave dryable inks must possess several properties, not the least of which is enabling substantially complete dissolution of the microwave coupling agent. Additional characteristics relating to the selection of an appropriate co-solvent include complete compatibility with water; suitable vapor pressure, for example, less than 0.1 millimeter of mercury; low toxicity properties; suitable intrinsic viscosity, for example, less than about 10 centipoise, high surface tension value, for example, greater than 30 dynes/centimeter; and enabling the substantially complete dissolution of the colorant. The total amount of co-solvent contained in the ink preferably ranges from 2% to 40% by weight of the ink, more preferably between 10% and 30% by weight of the ink.

Although ethylene glycol possesses excellent properties for use as a co-solvent, its use in high amounts in the ink is not desirable due to possible toxicity problems and the fact that inks containing higher amounts of ethylene glycol cause severe paper curl. In one embodiment of the present invention, rather than ethylene glycol, the preferred co-solvent is one or more of formylethanolamine, acetylethanolamine, triethanolamine, trimethylolpropane, thiodiethanol, sulfolane or 1,3-dimethylimidazolidinone. In addition to these co-solvents, the co-solvent may further include polyethylene glycol such as polyethylene glycol 200 or polyethylene glycol 400 in an amount of, for example, 1% to 20% by weight. All of the foregoing co-solvents have boiling points in excess of 240° C. and viscosities higher than ethylene glycol. These co-solvents are contained in the ink in an amount of, for example, 5% to 35% by weight, preferably 5% to 25% by weight.

The above preferred co-solvents are most preferably used in microwave dryable inks containing ammonium bromide as a microwave coupling agent. The properties of microwave dryable inks containing ammonium bromide and such co-solvents exhibit properties quite similar to inks using ethylene glycol as a co-solvent, particularly with respect to surface tension and conductivity, but have the advantage of exhibiting substantially no paper curl on a paper substrate. Furthermore, although such inks containing the above co-solvents have somewhat lower latency than inks using ethylene glycol as the co-solvent, the latency remains acceptable. For example, the latency is greater than 5 seconds in 300 dpi as well as 600 dpi printers.

If ammonium chloride is to be used as the microwave coupling agent, either alone or in combination with ammonium bromide, the above co-solvents may not be used alone as the co-solvent. This is because none of the preferred co-solvents exhibit a good ability to substantially solubilize ammonium chloride. Thus, in a second embodiment of the invention, the microwave dryable ink contains ammonium chloride and/or ammonium bromide as the microwave coupling agent, a first co-solvent of formylethanolamine, acetylethanolamine, triethanolamine, trimethylolpropane, thiodiethanol, sulfolane, 1,3-dimethyl-imidazolidinone, and/or polyethylene glycol, and ethylene glycol as a second co-solvent.

In this embodiment, ethylene glycol is required in an amount sufficient to substantially completely solubilize ammonium chloride in the ink. However, the amount must be low enough to cause substantially no paper curl. In order to prevent the occurrence of paper curl, the ratio of the first co-solvent to the second co-solvent is, for example, greater than 40:60, or equal to and preferably from 50:50 to 85:15. More particularly, the ethylene glycol is contained in such inks in an amount ranging from 1 to 15% by weight of the ink, more preferably between 2 and 10% by weight of the ink.

To further reduce the likelihood of paper curl developing following image formation, the microwave dryable inks may further contain appropriate anti-curl agents. Such agents preferably possess no properties adversely affecting the other properties of the ink, including latency. Preferred anti-curl agents are trimethylolpropane and glycerol propoxylate (number average molecular weight of 266). Trimethylolpropane is preferred as its viscosity is lower than the glycerol propoxylate so that it can be included in the ink in a higher amount, and further because it also functions as a co-solvent as discussed above. If an anti-curl agent is included in the ink, it is preferably included in an amount of from, for example, 1% to 15% by weight, more preferably 5% to 12% by weight of the ink. The microwave dryable inks of the invention containing anti-curl agents in such amounts exhibit substantially no paper curl following image formation, following drying or thereafter.

The colorant for the ink of the present invention preferably comprises one or more dyes. Examples of suitable dyes include anthraquinones, monoazo dyes, disazo dyes, phthalocyanines, aza[18]annulenes, formazan copper complexes, triphenodioxazines, Bernacid Red 2BBMN; Pontamine Brilliant Bond Blue A; Pontamine; Food Black 2; Carodirect Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc., Tricon Direct Red 227, available from Tricon; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brill Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X-34, available from BASF and a preferred dye in the present invention, Carta Black 2GT, available from Sandoz, Inc.; Direct Brilliant 25 Pink B (Crompton-Knolls); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Sirius Supra Yellow GD 167; Cartasol Brilliant Yellow 4GF (Sandoz); Pergasol Yellow CGP (Ciba-Geigy); Dermacarbon 2GT (Sandoz); Pyrazol Black BG (ICI); Morfast Black Conc A (Morton-Thiokol); Diazol Black RN Quad (ICI); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-jet series of dyes available from ICI, including Pro-jet Yellow I (Direct Yellow 86), Pro-Jet Magenta I (Acid Red 249), Pro-Jet Cyan I (Direct Blue 199), Pro-Jet Black I (Direct Black 168), Pro-Jet Yellow 1-G (Direct Yellow 132), Aminyl Brilliant Red F-B, available from Sumitomo Chemical Co. (Japan), the Duasyn line of "salt-free" dyes available from Hoechst, such as Duasyn Direct Black HEF-SF (Direct Black 168), Duasyn Black RL-SF (Reactive Black 31), Duasyn Direct Yellow 6G-SF VP216 (Direct Yellow 157), Duasyn Brilliant Yellow GL-SF VP220 (Reactive Yellow 37), Duasyn Acid Yellow XX-SF VP413 (Acid Yellow 23), Duasyn Brilliant Red F3B-SF VP218 (Reactive Red 180), Duasyn Rhodamine B-SF VP353 (Acid Red 52), Duasyn Direct Turquoise Blue FRL-SF VP368 (Direct Blue 199), Duasyn Acid Blue AE-SF VP344 (Acid Blue 9), and the like, as well as mixtures thereof. The dye is present in any effective amount, typically from about 1 to about 20 percent by weight, preferably for about 2 to about 10 percent by weight, and more preferably from about 2 to about 6 percent by weight, although the amount can be outside these ranges.

In addition, the colorant for the ink compositions of the present invention can be a pigment, or a mixture of one or more dyes and/or one or more pigments. The number of available suitable pigments is somewhat limited because the pigment must be able to remain stable in the presence of the ionic salts/microwave coupling agents and also not cause any arcing, scorching or burning during the microwave drying process. Examples of suitable carbon black pigments that may be used include Cabojet 200 and Cabojet 300, both available from Cabot Corp. Examples of color pigments that may be used without destabilizing, arcing, scorching or burning include Hostafine Red, Hostafine Yellow and Hostafine Blue, all available form Hoechst, and YGD-8850 Diarylide Yellow, QHD06040 Quindo Magenta and BGD-9346 G/S Blue, all available from Sun Chemicals.

Preferably, the pigment particle size is as small as possible to enable a stable colloidal suspension of the particles in the liquid vehicle and to prevent clogging of the ink channels when the ink is used in a thermal ink jet printer. Particle average diameters are generally from about 0.001 to about 5 microns, preferably from about 0.01 to about 2 microns, and more preferably from about 0.1 to about 1 micron, although the particle size can be outside these ranges. The pigments may be sonified, centrifuged and filtered to provide the desired particle size. The pigment is present in the ink composition in any effective amount, generally from about 1 to about 20 percent by weight, preferably from about 4 to about 10 percent by weight, and more preferably from about 5 to about 8 percent by weight, although the amount can be outside of these ranges.

The surface tension of the inks is, for example, between 35 and 50 dynes/cm, preferably between 40 and 50 dynes/cm.

The microwave dryable inks of the invention also preferably include a penetrant so that the ink properly penetrates into a paper substrate upon printing of an image on the substrate with the ink. It is critical that the ink penetrate to the appropriate depth in the paper substrate in order to achieve a good image on a substrate that dries quickly upon exposure to microwave radiation and does not flake off of the substrate following drying. If the ink penetrates too far into the paper, it is very difficult to dry the image with microwave radiation and the entire purpose of the salt is defeated. If the ink does not penetrate far enough into the substrate prior to microwave drying, efficient coupling with the electric field component will not occur, especially in small fonts. Preferred penetrants include N-methylpyrolididone, sulfoxides, ketones, lactones, esters, alcohols, glycol ethers, butyl carbitol, benzyl alcohol, N,N-diethyl-m-toluamide (DEET), cyclohexylpyrrolidinone and 1,2-hexanediol, or mixtures thereof. Most preferably, the penetrant is benzyl alcohol because of its low viscosity and the fact that it does not contribute to paper curl at the concentrations required. The penetrant is preferably included in the ink in the amount of, for example, 0.1–10% by weight of the ink, more preferably between 1 and 5% by weight of the ink.

Polymeric additives may also be included in the inks in order to enhance the viscosity of the ink. Suitable examples include polyacrylate salts, polyvinyl alcohols, cellulose derivatives, starch, polysaccharides, and the like. Preferably, such viscosity enhancers are added in an amount of between 0 and 5% by weight of ink. The viscosity of the ink should be, for example, between 1 and 5 centipoise, more preferably between 2 and 4 centipoise. If the viscosity of the ink is too high or too low, the ink may fail in forming bubbles during printing, or may exhibit a very poor drying time upon formation of an image.

Other optional additives to the inks employed in the process of the present invention include biocides such as Dowicil 150 or 200, benzoate salts, sorbate salts, and the like, present in an amount of from about 0.0001 to about 10 percent by weight, preferably from about 0.001 to about 8 percent by weight, and more preferably from about 0.01 to about 4.0 percent by weight, although the amount can be outside these ranges; pH controlling agents such as acids or bases, phosphate salts, carboxylates salts, sulfite salts, amine salts, and the like, present in an amount of from 0 to about 1 percent by weight, preferably from about 0.001 to about 1 percent by weight, and more preferably from about 0.01 to about 1 percent by weight, although the amount can be outside these ranges; or the like.

Inks suitable for the present invention can be prepared by any process suitable for preparing aqueous-based inks. For example, the ink ingredients can be mixed in the desired amounts and stirred until a uniform ink composition results (typically about 30 minutes, although the mixing/stirring time can be either greater or less than this period). While not required, the ink ingredients can be heated during mixing if desired. Subsequent to mixing and stirring, the ink composition generally is filtered to remove any large solid or particulate matter. The ionic compound component of the ink can be added with the other ink ingredients during preparation of the ink. Alternatively, the ionic compound can be added to an ink composition subsequent to mixing and stirring of the other ingredients. Any other suitable processes for preparing the inks can also be employed.

The ink is applied to a suitable substrate in an imagewise fashion. Application of the ink to the substrate can be by any suitable process compatible with aqueous-based inks, such as flexographic printing, pen plotters, continuous stream ink jet printing, drop-on-demand ink jet printing (including both piezoelectric and thermal ink jet processes), or the like.

The substrate employed can be any substrate compatible with aqueous-based inks, including plain paper, such as Xerox® series 10 paper, Xerox® 4024 paper, or the like, coated papers such as those available from Jujo, transparency materials suitable for aqueous inks or ink jet printing processes, or the like.

Any suitable microwave drying apparatus can be employed for drying the ink after an image is formed with the ink upon the substrate. For example, a suitable microwave drying apparatus is disclosed in U.S. Pat. No. 5,220,346, which is incorporated herein by reference. The power of the microwave drying apparatus preferably ranges from between, for example, about 100 to about 1000 watts. Upon exposure to such microwave radiation, images formed with the ink are heated and dried rapidly, for example on the order of a few seconds or less.

The invention will now be further described with reference to the following examples. In each of the examples and comparative examples, the microwave dryable inks are prepared by mixing the recited materials in the amounts shown. In all of the formulations, the balance of the formulation is deionized water.

EXAMPLE 1

| | |
|---|---|
| 15% | ethylene glycol (EG) |
| 10% | 1,3-dimethylimidazolidinone (1,3-DMI) |
| 2.5% | benzyl alcohol |
| 3.0% | ammonium bromide |
| 17% | BASF X-34 dye (X-34) (33% solution) |
| 3% | Tricon Direct red 227 dye (DR 227) (10% solution) |
| 0.05% | polyethylene oxide (PEO 18.5K) |
| 0.05% | Dowicil 200 |

The ink exhibits a viscosity of 2.5 cp, a surface tension of 47.7 dynes/cm, a conductivity of 21.2 ms/cm. Further, when evaluated for latency (i.e., the maximum decap or idle time a jet can endure without maintenance such that the jet when then fired can still expel a "nominal" drop having proper mass and velocity to produce a normal "dot" on the receiver sheet), the latency is on the order of 200 seconds.

Comparative Example 1

```
  30%  EG
1.25%  benzyl alcohol
 1.5%  ammonium chloride
  17%  X-34 (33% solution)
   3%  DR 227 (10% solution)
0.05%  PEO 18.5K
0.05%  Dowicil 200
```

This typical ink formulation has a viscosity of 2.73 cp, a surface tension of 48.4 dynes/cm and a conductivity of 19.0 ms/cm. Latency is on the order of 5000 sec. However, following drying of an image formed with the ink, the substrate exhibits severe paper curl and takes the form of a tube.

Comparative Example 2

```
  40%  EG
   2%  ammonium chloride
  17%  X-34 (33% solution)
   3%  DR 227 (10% solution)
0.05%  PEO 18.5K
0.05%  Dowicil 200
1.25%  benzyl alcohol
       Properties:
            surface tension: 47.0 dynes/cm
            conductivity: 17.8 ms/cm
            viscosity: 3.42 cp
            latency: too unstable to measure
```

Comparative Example 3

```
  20%  EG
 7.5%  trimethylolpropane (TMP)
 2.5%  benzyl alcohol
2.25%  ammonium bromide
  17%  X-34 (33% solution)
   3%  DR 227 (10% solution)
0.05%  PEO 18.5K
0.05%  Dowicil 200
       Properties:
            surface tension: 45.2 dynes/cm
            conductivity: 16.5 ms/cm
            viscosity: 2.77 cp
```

This ink, despite the inclusion of trimethylol propane, still exhibits paper curl following drying because of the high content of ethylene glycol.

EXAMPLE 2

```
  20%  TMP
 7.5%  EG
 2.5%  benzyl alcohol
   2%  ammonium bromide
  17%  X-34 (33% solution)
   3%  DR 227 (10% solution)
0.05%  PEO 18.5K
0.05%  Dowicil 200
```

Properties:

surface tension: 44.8 dynes/cm
conductivity: 14.3 ms/cm
viscosity: 3.75 cp

Unlike the ink of Comparative Example 3, this ink exhibits no paper curl following microwave drying. Latency is acceptable, on the order of 5 seconds.

EXAMPLE 3

In an effort to improve the drying of Example 2, which penetrates a paper substrate to a high but acceptable degree, the following ink without benzyl alcohol penetrant is prepared.

```
  20%  TMP
   6%  EG
 2.5%  ammonium bromide
  17%  X-34 (33% solution)
   3%  DR 227 (16% solution)
0.05%  PEO
0.05%  Dowicil 200
       Properties:
            surface tension: 49.2 dynes/cm
            conductivity: 15.6 ms/cm
            viscosity: ~3.20 cp
            latency: ~5 seconds
```

This ink dries rapidly and exhibits no paper curl following microwave drying.

EXAMPLE 4

```
  10%  TMP
  10%  glycerol propoxylate (GP 266)
 2.5%  ammonium bromide
  18%  X-34 (33% solution)
   3%  DR 227 (10% solution)
0.05%  PEO 18.5K
0.05%  Dowicil 200
       Properties:
            surface tension: 38 dynes/cm
            conductivity: 22.4 ms/cm
            viscosity: 2.86 cp
```

This ink has a latency of about 2 seconds, but exhibits no paper curl following microwave drying of an image formed with the ink.

EXAMPLE 5

```
  20%  TMP
   1%  benzyl alcohol
 2.0%  ammonium bromide
  17%  X-34 (33% solution)
   3%  DR 227 (10% solution)
0.05%  PEO 18.5K
0.05%  Dowicil 200
       Properties:
            surface tension: 47.1 dynes/cm
            conductivity: 16.2 ms/cm
            viscosity: ~2.75 cp
            latency: 5 seconds
```

EXAMPLE 6

10% TMP
10% thiodiethanol (TDE)
1% benzyl alcohol
2.0% ammonium bromide
17% X-34 (33% solution)
3% DR 227 (10% solution)
0.05% PEO 18.5K
0.05% Dowicil 200

Properties:

surface tension: 47 dynes/cm
conductivity: 23.5 ms/cm
viscosity: 2.40 cp
latency: 10 seconds

EXAMPLE 7

10% TDE
10% TMP
1% benzyl alcohol
1% ammonium bromide
3% DR 227 (10% solution)
17% X-34 (33% solution)
0.05% PEO 18.5K
0.05% Dowicil 200

Properties:

conductivity: 11.5 ms/cm
latency: 10 seconds

EXAMPLE 8

11% GP 266
10% TDE
1.75% ammonium bromide
0.05% PEO 18.5K
0.05% Dowicil 200
17% X-34 dye (33% solution)
3% DR 227 (10% solution)

Properties:

surface tension: 42.3 dynes/cm
conductivity: 16 ms/cm
viscosity: 2.62 cp
latency: 10 seconds

EXAMPLE 9

10% GP 266
10% 1,3-dimethylimidazolidinone
2% ammonium bromide
17% X-34 (33% solution)
3% DR 227 (10% solution)
0.05% PEO 18.5K
0.05% Dowicil 200

Properties:

surface tension: 42 dynes/cm
conductivity: 17.3 ms/cm
viscosity: 2.62 cp
latency: 5 seconds

EXAMPLE 10

10% TMP
10% 1,3-dimethylimidazolidinone
1.6% ammonium bromide
0.05% PEO 18.5K
0.05% Dowicil 200
17% X-34 dye (33% solution)
3% DR 227 (10% solution)

Properties:

surface tension: 46.1 dynes/cm
conductivity: 16 ms/cm
viscosity: 2.60 cp

EXAMPLE 11

10% formylethanolamine (pH 10.5)
10% GP 266
80% Zeneca Pro-Jet Fast Black 2 dye (4% solution)
0.05% PEO 18.5K
0.05% Dowicil 200
1.75% ammonium bromide Properties:

surface tension: 37.7 dynes/cm
conductivity: 16 ms/cm
viscosity: 2.10 cp
latency: 5 seconds

EXAMPLE 12

10% formylethanolamine
10% TMP
1.75% ammonium bromide
80% Zeneca Pro-Jet Fast Black 2 dye (4% solution)
0.05% PEO 18.5K
0.05% Dowicil 200
1.75% ammonium bromide Properties:

surface tension: 47.0 dynes/cm
conductivity: 17.5 ms/cm
viscosity: 1.95 cp

EXAMPLE 13

10% sulfolane
15% triethanolamine
2.25% NaBr
17% BASF X-34 dye (33% solution)
3% DR 227
0.05% PEO 18.5K
0.05% Dowicil 200

Properties:

surface tension: 54 dynes/cm
conductivity: 15 ms/cm
viscosity: 2.5 cp
latency: 10 seconds As can be seen from the results of the Examples and Comparative Examples, microwave dryable inks of the present invention possess good thermal ink jet properties, particularly with respect to viscosity and surface tension, while also exhibiting satisfactory latency. None of the Example inks of the invention exhibit paper curl. Thus, microwave dryable inks may be prepared without ethylene glycol as a co-solvent when using ammonium bromide as the microwave coupling agent, and may be prepared with minimal amounts of ethylene glycol so as to substantially eliminate paper curl caused by higher amounts of ethylene glycol when using ammonium chloride as the microwave coupling agent.

While this invention has been described in conjunction with specific embodiments thereof, it is evident that many alternatives, modifications and variations will be apparent to those skilled in the art. Accordingly, the preferred embodiments as set forth herein are intended to be illustrative. Various changes may be made without departing from the spirit and scope of the invention as defined above.

What is claimed is:

1. A microwave dryable thermal ink jet ink comprising an aqueous liquid vehicle, a first co-solvent selected from the group consisting of formylethanolamine, acetylethanolamine, triethanolamine, trimethylolpropane, thiodiethanol, sulfolane and 1,3-dimethylimidazolidinone, ethylene glycol in an amount of from 0 to 15% by weight as an optional second co-solvent a colorant, and ammonium bromide.

2. The microwave dryable thermal ink jet ink according to claim 1, wherein the first co-solvent comprises 5 to 35% by weight of the ink and ammonium bromide comprises 1 to 5% by weight of the ink.

3. The microwave dryable thermal ink jet ink according to claim 1, wherein the ethylene glycol is present in an amount of from 1 to 15% by weight of the ink.

4. The microwave dryable thermal ink jet ink according to claim 1, wherein the ink further comprises polyethylene glycol as a further co-solvent in an amount from 1 to 20% by weight of the ink.

5. The microwave dryable thermal ink jet ink according to claim 1, wherein the colorant is a dye.

6. The microwave dryable thermal ink jet ink according to claim 1, wherein the ink further comprises benzyl alcohol as a penetrant.

7. The microwave dryable thermal ink jet ink according to claim 1, wherein the ink further comprises anti-curl agent in an amount of from 1 to 15% by weight of the ink.

8. The microwave dryable thermal ink jet ink according to claim 7, wherein the anti-curl agent is glycerol propoxylate.

9. A microwave dryable thermal ink jet ink comprising an aqueous liquid vehicle, a first co-solvent selected from the group consisting of formylethanolamine, acetylethanolamine, triethanolamine, trimethylolpropane, thiodiethanol, sulfolane and 1,3-dimethylimidazolidinone, ethylene glycol as a second co-solvent in an amount of from 1 to 15% by weight, a colorant and a microwave coupling agent selected from the group consisting of ammonium bromide, ammonium chloride and mixtures thereof.

10. The microwave dryable thermal ink jet ink according to claim 9, wherein the ratio of the first co-solvent to the second co-solvent is greater than or equal to 40:60, the first co-solvent and second co-solvent together comprise between 2 and 40% by weight of the ink, and the microwave coupling agent comprises between 1 and 5% by weight of the ink.

11. The microwave dryable thermal ink jet ink according to claim 9, wherein the ink further comprises polyethylene glycol as a third co-solvent in an amount from 1 to 20% by weight of the ink.

12. The microwave dryable thermal ink jet ink according to claim 9, wherein the colorant is a dye.

13. The microwave dryable thermal ink jet ink according to claim 9, wherein the ink further comprises benzyl alcohol as a penetrant.

14. The microwave dryable thermal ink jet ink according to claim 9, wherein the ink further comprises anti-curl agent in an amount of from 1 to 15% by weight of the ink.

15. The microwave dryable thermal ink jet ink according to claim 14, wherein the anti-curl agent is glycerol propoxylate.

16. The microwave dryable thermal ink jet ink according to claim 9, wherein the microwave coupling agent is ammonium chloride.

17. A method of forming an image on an image receiving substrate with a microwave dryable thermal ink jet ink comprising applying in imagewise fashion to the image receiving substrate by thermal ink jetting a microwave dryable thermal ink jet ink comprising a first co-solvent selected from the group consisting of formylethanolamine, acetylethanolamine, triethanolamine, trimethylolpropane, thiodiethanol, sulfolane and 1,3-dimethylimidazolidinone, ethylene glycol in an amount of from 0 to 15% by weight as an optional second co-solvent, a colorant, and ammonium bromide, and thereafter exposing the image receiving substrate to microwave radiation to dry the image on the substrate.

18. A method according to claim 17, wherein the microwave thermal ink jet ink further comprises an anti-curl agent and benzyl alcohol as a penetrant.

19. A method of forming an image on an image receiving substrate with a microwave dryable thermal ink jet ink, comprising applying in imagewise fashion to the image receiving substrate by thermal ink jetting a microwave dryable thermal ink jet ink comprising a first co-solvent selected from the group consisting of formylethanolamine, acetylethanolamine, triethanolamine, trimethylolpropane, thiodiethanol, sulfolane and 1,3-dimethylimidazolidinone, ethylene glycol as a second co-solvent in an amount of from 1 to 15% by weight, a colorant and a microwave coupling agent selected from the group consisting of ammonium bromide, ammonium chloride and mixtures thereof, and thereafter exposing the image receiving substrate to microwave radiation to dry the image on the substrate.

20. A method according to claim 19, wherein the microwave thermal ink jet ink further comprises an anti-curl agent and benzyl alcohol as a penetrant.

* * * * *